Patented Jan. 11, 1938

2,105,208

UNITED STATES PATENT OFFICE 2,105,208

MANUFACTURE OF VINYL RESINS

Maurice Belloc, Paris, France, assignor to Societe Nobel Francaise, Paris, France, a joint-stock company of France No Drawing. Application April 12, 1935, Serial No. 16,034. In France May 3, 1934

11 Claims. (Cl. 106—22)

The present invention relates to vinyl resins prepared from polyvinyl alcohols and aliphatic aldehydes. These products can be prepared, either by treating polyvinyl alcohol which has been previously isolated, with an aldehyde in the presence of suitable catalysts, or directly from polyvinyl esters, as described for example in Letters Patent No. 1,990,399. The present invention therefore applies generally to condensation products probably having the following chemical structure:

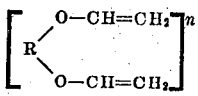

in which R represents a bivalent aliphatic radical:

in the case in which formaldehyde is used,

in the case in which acetalydehyde is used, etc. . . . It does not apply to the other vinyl compounds, such for example as are the object of French Patent No. 733,681 which are not compounds having an acetal structure.

It has been found that the condensation products referred to above have rather poor heat-resisting qualities. They will endure a prolonged heating to 100-105° C. This may have serious drawbacks in certain cases, in particular when the objects made from such products are temporarily subjected to a high temperature.

The object of the present invention consists in the discovery that it is possible to totally eliminate the yellowing or browning of polymerized acetals derived from vinyl alcohol when a small quantity of an anti-oxidant is added to these products. The action of anti-oxidants is known per se, it has been applied for many years in the acrolein and rubber industries, but it has not been observed for the products considered herein. Anti-oxidants known at the present time are very numerous, but hydroquinone, pyrogallol and the anti-oxidant for rubber, known in the trade under the name "Antioxidant RR5" (probably indene resorcyl) have proved to be quite well adapted to the use in question. The following examples will enable the object of the invention to be better understood, without in any way limiting the same.

A vinyl formal is first prepared according to the directions given in the first above mentioned patent, as follows:

Polyvinyl acetate of high viscosity__kgs____ 1.5
Hydrochloric acid at 22° Beaumé___kgs____ 7.0
Denatured alcohol_____liter____ 0.5
Formal in aqueous solution at 40%__kgs____ 0.84 are mixed in a suitable apparatus.

The mixture is stirred for 15 hours, then allowed to rest for 33 hours at room temperature. After this time has elapsed, precipitation is effected with water, the precipitate is washed until neutral, and dried. A formal is obtained which is insoluble in the usual organic solvents, soluble in methylene chloride. A 15% solution by weight of this formal is prepared in methylene chloride.

*Example 1.*—There is added to the preceding solution of formal, 1% by weight (reckoned with respect to the formal) of pure hydroquinone, in the form for example of a 1% solution in ethanol. The mixture is stirred thoroughly.

The stabilized collodion is cast in the form of a film having a final thickness of $\tfrac{1}{10}$ mm.

If said film is heated to 100° C. for 96 hours, it shows no trace of yellowing, whereas a film which does not contain hydroquinone turns a light brown colour after 16 hours heating at 100° C.

*Example 2.*—There is added to the solution of formal prepared above, 0.03% by weight (reckoned with respect to the formal) of pure hydroquinone, in the form of a dilute solution in ethanol or methanol. Casting is carried out as in Example 1. The film obtained will bear heating to 100° C. for 24 hours without showing any trace of yellowing.

It is obvious that the use of hydroquinone in very small quantities has great advantages, in particular when the films cast are intended to serve as a support for a photographic emulsion which is sensitive to the action of reducers.

*Example 3.*—There is added to the solution of formal prepared above, 0.5% by weight (reckoned with respect to the formal), of pure pyrogallol in solution in methanol.

The film, cast as in the previous examples, will bear heating for 48 hours at 100° C. without yellowing, but it is slightly more coloured from the outset than those which are stabilized with hydroquinone, owing to the ready oxidation of pyrogallol.

*Example 4.*—There is added to the solution of formal prepared above, 1% by weight (reckoned with respect to the formal) of the antioxidant for rubber which is to be found in the trade under the name of "Antioxidant RR5".

The film containing the anti-oxidant in question and cast as in the previous examples, will bear heating for 36 hours at 100° C. without appreciable yellowing. It is likewise more coloured from the outset than the films stabilized with hydroquinone.

It is pointed out finally that the stabilization which is the object of the present invention has a favourable effect, not only on the colour of the heated products, but also on their mechanical properties.

It will be noted, for example if the products stabilized in Example 1 are studied, that if the resistance to tearing of the non-heated film without hydroquinone is arbitrarily represented by 40, that of the film without hydroquinone heated for 96 hours at 100° C. is represented by 10, whereas that of the film containing 1% of hydroquinone and heated for the same period of time, is 25.

I claim:

1. A resin prepared from a polyvinyl alcohol and an aliphatic aldehyde having incorporated therein an antioxidant of the polyhydroxybenzol type effective to suppress yellowing at a temperature of 100° C.

2. A polymerized polyvinyl acetal stabilized with a relatively small quantity of an antioxidant of the polyhydroxybenzol type effective to suppress yellowing at a temperature of 100° C.

3. A resin according to claim 1 in which the antioxidant is hydroquinone.

4. A resin according to claim 2 in which the antioxidant is hydroquinone.

5. A resin according to claim 1 in which the aldehyde is formaldehyde.

6. A resin according to claim 1 in which the aldehyde is acetaldehyde.

7. A condensation product having the chemical structure

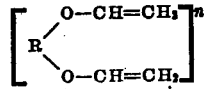

in which R is an aliphatic aldehyde, stabilized by the addition thereto of an antioxidant of the polyhydroxybenzol type effective to suppress yellowing at a temperature of 100° C.

8. A product according to claim 7 in which R represents a bivalent aliphatic radical.

9. A polymerized acetal of polyvinyl alcohol and an aldehyde having incorporated therein a relatively small quantity of an antioxidant of the polyhydroxybenzol type which effectively suppresses yellowing at temperatures in the neighborhood of 100° C.

10. The method of producing a stabilized resinous product which comprises dissolving a polyvinyl formal in methylene chloride and incorporating in the solution a relatively small quantity of an antioxidant of the polyhydroxybenzol type effective to suppress yellowing at a temperature of 100° C.

11. In the method of claim 10 incorporating hydroquinone in an amount which is not more than about 1% of the weight of formal as an antioxidant.

MAURICE BELLOC.